United States Patent

[11] 3,574,971

[72] Inventor Julius Hezler, Jr.
 Bellaire, Mich.
[21] Appl. No. 876,453
[22] Filed Nov. 13, 1969
[45] Patented Apr. 13, 1971
[73] Assignee General Motors Corporation
 Detroit, Mich.

[54] WINDOW REGULATOR ASSEMBLY
 3 Claims, 6 Drawing Figs.
[52] U.S. Cl. ............................................ 49/350,
 74/110
[51] Int. Cl. ........................................ E05f 11/44
[50] Field of Search .......................... 49/348-
 —353, 360, 363, 227; 74/110

[56] References Cited
 UNITED STATES PATENTS
 1,805,217 5/1931 Lawrence et al. ............ 49/353
 2,093,350 9/1937 Chandler .................... 49/353X
 2,157,350 5/1939 Ruska ........................ 49/353

*Primary Examiner*—J. Karl Bell
*Attorneys*—W. E. Finken and D. L. Ellis

ABSTRACT: A window regulator assembly for an automobile type window panel includes a reciprocating input type window operator for vertically shifting the window panel and a reciprocating input arrangement. The input arrangement includes a control member reciprocably shiftable in a track, a draft link reciprocably shiftable to drive the window operator and a blocking member therebetween shiftable and rotatable relative to the track. The blocking member is engageable by means on the control member to rigidly couple the latter to the draft link under a positive or window-controlling input to the control member and is rotatable by the draft link into a movement-blocking position upon a negative input to the window operator directly from the window panel.

Patented April 13, 1971

INVENTOR.
Julius Hezler, Jr.
BY
O. L. Ellis
ATTORNEY

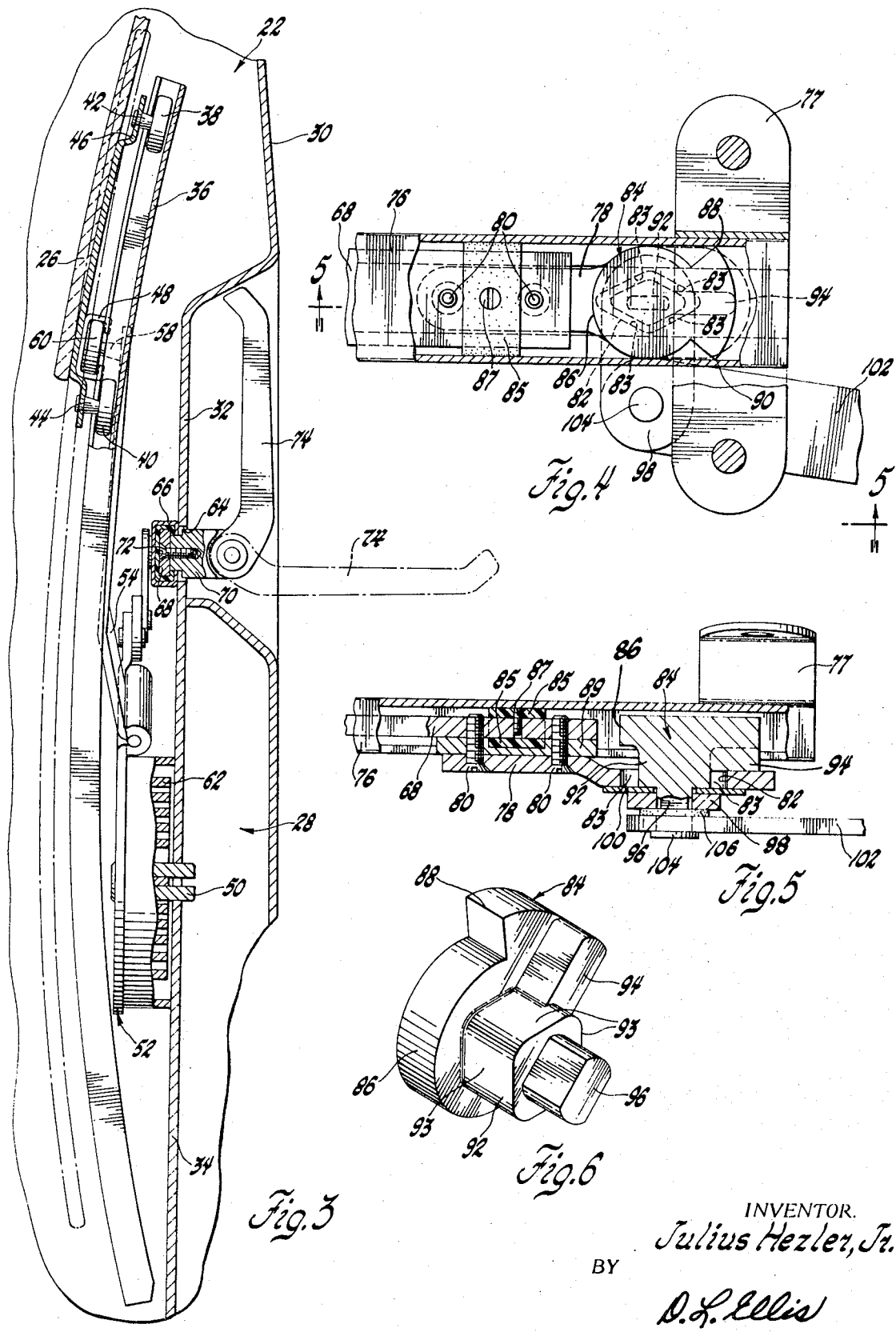

WINDOW REGULATOR ASSEMBLY

This invention relates generally to window regulator assemblies and in particular to arrangements therein for preventing movement of the window panel when a motivating force is applied directly thereto.

The primary feature of this invention is that it provides an improved vehicle window regulator assembly. Another feature of this invention resides in the provision in the window regulator assembly of a new and improved blocking arrangement for preventing movement of the window panel when a motivating force is applied directly thereto. Yet another feature of this invention resides in the provision in combination with a reciprocating input-type window-operating mechanism of an input arrangement including a pair of reciprocably shiftable members having a blocking member therebetween movable in a fixed track which blocking member functions to rigidly couple together the two shiftable members under a positive or forward input to the arrangement and which is rotatable into a blocking position by one of the reciprocating members upon a negative or reverse input to the arrangement from the window-operating mechanism. Still another feature of this invention is that it provides an input arrangement wherein one of the reciprocably shiftable members includes means for selective operation or positive input thereto from inside the vehicle body member and for maintaining the blocking member in a nonblocking position rigidly coupling together the two reciprocably shiftable members during such positive input.

These and other features of this invention will be readily apparent from the following specification and from the drawings wherein:

FIG. 3 is an enlarged sectional view taken generally along the plane indicated by lines 3–3 in FIG. 2;

FIG. 4 is an enlarged view of a portion of FIG. 1 showing the blocking arrangement according to this invention;

FIG. 5 is a sectional view taken generally along the plane indicated by lines 5–5 in FIG. 4; and FIG. 6 is an enlarged perspective view of the blocking member portion of the window regulator assembly according to this invention.

Figure 1:
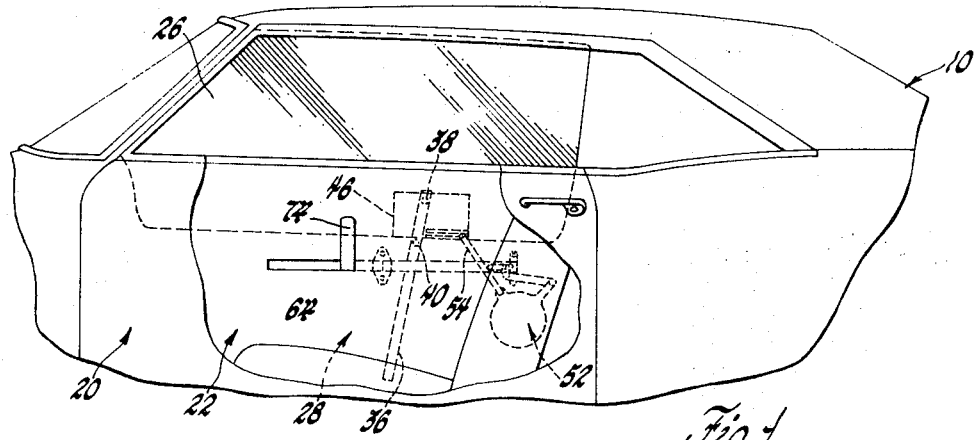
FIG. 1 is a partially broken away fragmentary elevational view of an automobile type of vehicle including a window regulator assembly according to this invention.

Referring now to FIG. 1 of the drawings, an automobile-type vehicle includes a body generally designated 10 having a pair of doors 20 and 22 conventionally hinged thereon for swinging movement between opened and closed positions. Each door has mounted thereon a window panel movable between raised and lowered positions to close and open a portion of the door opening in the closed position of the door and a reciprocating input-type window regulator assembly for moving the window panel between the raised and lowered positions, only a window panel 26 and a regulator assembly 28 mounted on door 22 being shown.

Figure 2:
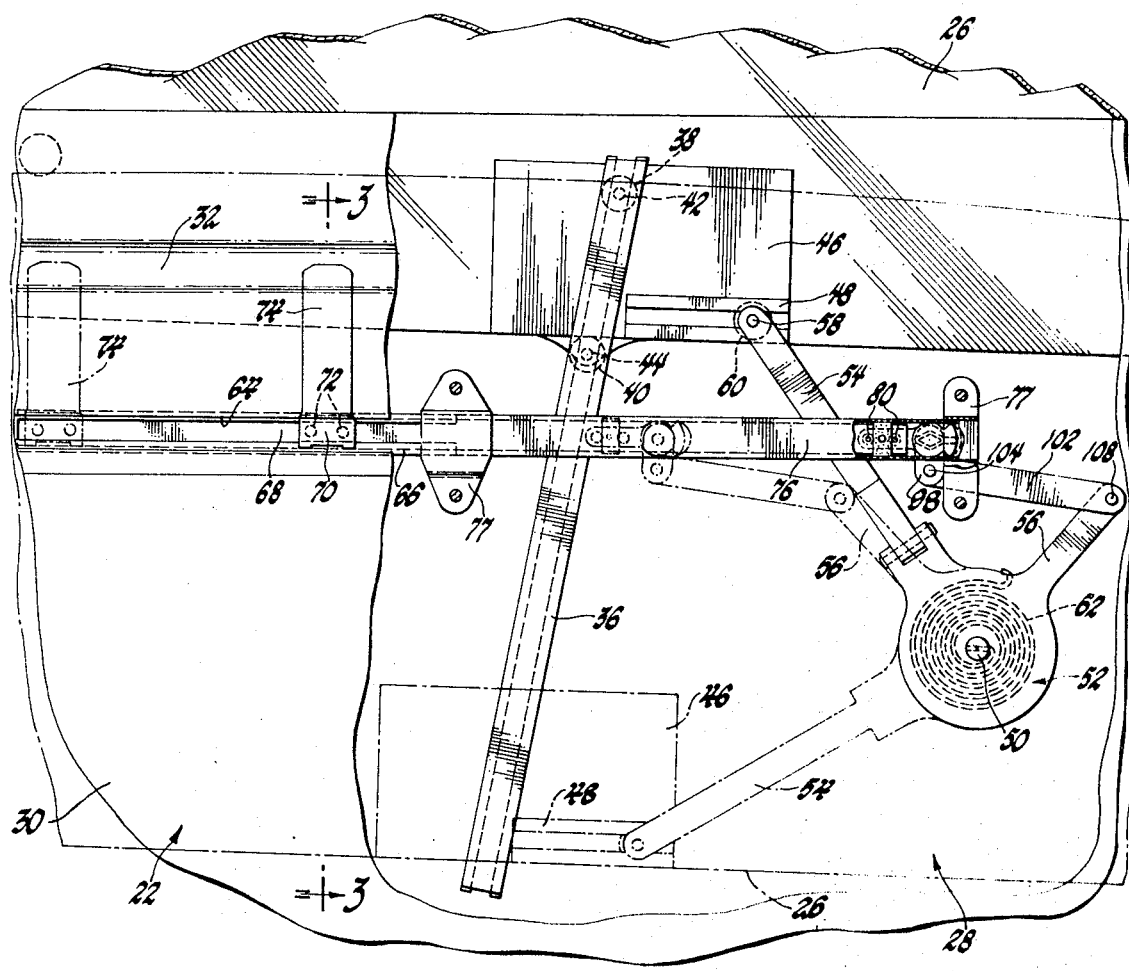
FIG. 2 is an enlarged partially broken away view of a portion of FIG. 1.

Referring now to FIGS. 2 and 3, door 22 includes an inner panel 30 having a generally longitudinally extending indentation 32 therein and an intermediate support panel 34, seen best in FIG. 3, fixedly secured to the inner surface of the inner panel, as by welding. A channel-shaped window guide track 36 is secured to the inner panel by conventional means, not shown, and carries therein a pair of rollers 38 and 40 rotatably mounted on spindles 42 and 44 respectively projecting from a window sash plate 46. Sash plate 46 is adjustably secured to window panel 36 by conventional means, now shown, so that the window panel is positionally guided during movement between raised and lowered positions. A generally channel-shaped track segment 48 is fixedly secured to the sash plate 46.

A slotted stud 50 is rigidly attached to and projects from support panel 34 and has a reciprocating input-type window-operating mechanism in the form of a bellcrank 52 pivotally mounted thereon for movement between a retracted position and an extended position, shown respectively in solid and broken lines in FIG. 2. Bellcrank 52 includes an articulated lift arm 54 and a drive arm 56. A spindle 58 projects generally perpendicularly from the end of lift arm 54 and has a roller 60 rotatably mounted thereon. A counterbalancing coil torsion spring 62 having one end attached to the bellcrank and the other end to the slotted stud urges the bellcrank toward the retracted position. The roller 60 is received within track segment 48 so that as the bellcrank pivots between retracted and extended positions the window panel is driven between raised and lowered positions, the latter being shown respectively in solid and broken lines in FIG. 3.

As best seen in FIG. 3, inner panel 30 has a longitudinally extending elongated aperture 64 therein on the innermost surface of indentation 32. Track means including a channel-shaped guide member portion 66 is fixedly secured to the inner surface of the inner panel, as by welding, with the mouth of the guide member portion facing aperture 64. A control member 68 in the form of a generally flat bar is received within the guide member for reciprocable shifting movement and a handle base 70 protrudes through the elongated aperture 64 and is rigidly attached to the control member by screws 72. A control handle 74 is mounted on the handle base for pivotal movement between a retracted position and an extended position, shown in solid and broken lines respectively in FIG. 3, and the control member and control handle are reciprocably shiftable as a unit in the guide member between a rearward position and a forward position, shown in solid and broken lines respectively in FIG. 2.

With particular reference to FIGS. 2, 4, 5 and 6, a generally channel-shaped portion 76 of the track means abuts an end of the guide member portion 66 and is fixedly secured to the inner surface of the inner panel, as by brackets 77, with the mouth thereof facing the direction opposite to that of the mouth of the guide member portion. Track portion 76 receives a distal end of control member 68 to which end an intermediate plate or clutch member 78 is rigidly secured by screws 80 and which intermediate plate has a generally diamond-shaped clutch aperture 82 therein having four edges 83. A pair of nylon-bearing strips 85 secured to the end of control member 68 by a screw 87 maintain the control member centered in track 76 and a bar 89 laterally spaces the intermediate plate 78 from the control member. A blocking member 84 is rotatably and shiftably received with the track portion 76 generally adjacent the distal end of the control member and includes a generally circular body portion 86, a pair of gripping edges 88 and 90, a generally diamond-shaped clutch projection 92 substantially smaller than clutch aperture 82 and having sides 93, a spacer 94 and a double D-shaped crank projection 96.

As best seen in FIG. 5, the diamond-shaped clutch projection on the blocking member is freely received within the diamond-shaped aperture 82 or the intermediate plate and the spacer 94 abuts the side of the intermediate plate to maintain a predetermined distance between the body portion 86 and the plate so that the body portion remains aligned on the track 76. A crankarm 98 is mounted on the crank projection 96 for movement as a unit with the blocking member and is spaced from the intermediate plate 78 by a washer 100. One end of a draft link 102 is pivotally connected to the free end of the crankarm of 104 and spaced therefrom by a washer 106 while the other end of the draft link is crankarm connected to bellcrank drive arm 56 at 108.

The blocking member functions to rigidly connect the reciprocably shiftable control member 68 and draft link 102 so that the latter is reciprocably shiftable under a positive window controlling input to the control handle 74 and as a fixed stop to prevent substantial movement of the window panel under a negative or reverse input to the regulator assembly such as a force applied directly to the window panel 26. More particularly, the clearance between the edges 83 of clutch aperture 82 and the sides 93 of clutch projection 92 permits free relative movement between the control and blocking members between a mean condition, FIG. 4, wherein the sides 94 are spaced from and substantially parallel to the edges 83, and either of two engaged conditions, now shown, respective to the direction of positive input applied to the control member 68 through control handle 74, wherein a pair of adjacent sides of the clutch projection are captured in the wedge formed by the corresponding pair of adjacent edges of the clutch aperture. The generally circular configuration of the body portion 88 of the blocking member 84 permits rotation of the control member relative to the track portion 76 about an axis generally perpendicular to the plane of the blocking member and passing through the point of contact between body portion 86 and the lower edge of track 76 between a relaxed position, FIG. 4, wherein the gripping edges 88 and 90 are free of the track and a blocking position, not shown, wherein one of the gripping edges bindingly engages the track to prevent sliding movement of the blocking member. With the control and blocking members in engaged condition, the latter is held fixed in the relaxed position thereof and is reciprocably shiftable as a unit with the control member to thereby reciprocably shift draft link 102 and pivot the bellcrank 52.

In the reverse or negative input situation, wherein a motivating force is applied directly to the window panel, the window panel begins to move toward either the raised or lowered positions and initiates momentary pivotal movement of the bellcrank 52 and shifting movement of the draft link 102. The forced shifting movement of the draft link, connected to the blocking member through the crankarm 98 at a point vertically spaced from the axis of rotation of the blocking member, initiates momentary rotation of the blocking member relative to the tracks 76 from the relaxed position to the blocking position thereof. With one gripping edge 88 or 90 thus bindingly engaging the track, the blocking member is nonshiftable thereon so that further movement of the draft link and bellcrank, and hence movement of window panel 26, is prevented. Increasing the motivating force on the window panel only creates a tighter bind between the gripping edge and the track so that shifting movement of the blocking member remains impossible.

In the preferred embodiment, the blocking arrangement is self-aligning to facilitate movement of the blocking member from the blocking position thereof into the engaged condition with the control member and vice versa. More particularly, the weight of the window panel acts as negative input or a motivating force applied directly thereto and rotates the blocking member into blocking position as described hereinbefore. Thus rotated, the sides 93 of the clutch projection do not lie parallel to the edges 83 of the clutch aperture as is required for most efficient capture by the edges of the latter. Under a positive input, however, initial shifting movement of the control member relative to the stationary blocking member brings an edge of the clutch aperture into engagement with a corner of the rotated clutch projection and continued movement of the edge cams the projection and the blocking member out of blocking position and back to the relaxed position thereof. Continued relative shifting movement, then, brings the blocking and control members from the means condition into engaged condition as described hereinbefore. Conversely, following cessation of positive input to the control member, the weight of the window panel urges the blocking member to rotate toward the blocking position. A corner of the clutch projection 92 between sides 93 then engages an edge of the clutch aperture 82 and, because of the slight resistance offered by the control member, cams the clutch projection sides away from the clutch aperture edges as the control member assumes blocking position.

Referring now to FIGS. 2 and 3 in description of a typical operational sequence of the regulator assembly from the raised position of the window panel, shown in solid lines in FIG. 2, the retracted control handle 74 is grasped and rotated to extended position, FIG. 3, whereupon the control member is manually shifted forwardly on the door from the rearward to the forward position thereof. Initial movement of the control member brings the blocking member into engaged condition therewith so that subsequent shifting of the blocking member and draft link as a unit with the control member pivots the bellcrank from the retracted to the extended position to bring the window panel to lowered position. Of course, the control member may be stopped at any position corresponding to a desired window panel position. The weight of the window panel, acting as a negative input, sufficiently exceeds the counterbalancing effort of the spring 62 so that the bellcrank urges the blocking member to blocking position and thus maintains the window in the desired position. To alter the position of the window panel, the procedure is simply repeated with the control member being shifted according to the desired position of the window panel.

It will, of course, be obvious to one skilled in the art that means other than the weight of the window panel functioning as a negative input could be employed to maintain the window panel in any position from fully raised to fully lowered. That is, following each cycle of positive or negative input to the regulator assembly, the blocking member would be urged back to the mean condition relative to the control member with the external holding means then becoming operative to maintain the window panel in position.

I claim:

1. In combination in a vehicle body having a window panel mounted therein for movement between raised and lowered positions relative thereto, track means fixed to said vehicle body, a window panel operating mechanism responsive to a reciprocating input and being operable upon such input to move said window panel between said raised and lowered position, a control member selectively reciprocably shiftable along said track means, a blocking member having gripping means thereon, said blocking member being shiftable along said track means and being rotatable relative thereto about an axis of the former between a relaxed position and a blocking position wherein said gripping means bindingly engage said track means to prevent shifting movement of said block member, clutch means on said control and blocking members engageable upon shiftable movement of said control member relative to said blocking member under a positive window-controlling input to the former to maintain said blocking member in said relaxed position and reciprocably shiftable as a unit with said control member, a draft link, means pivotally connecting a first end of said draft link to said blocking member on an axis spaced from the first-mentioned axis thereof, and means connecting a second end of said draft link to said window-operating mechanism, said draft link being shiftable under shifting movement of said blocking member as a unit with said control member to operate said window-operating mechanism and being momentarily shiftable upon reverse input to said window-operating mechanism under a force applied directly to said window panel to rotate said blocking member to said blocking position thereof so that shifting movement of said blocking member and further reverse shifting movement of said draft link is prevented.

2. In a vehicle body having a window panel mounted therein for movement between raised and lowered positions relative thereto, track means fixed to said vehicle body, a window panel operating mechanism responsive to a reciprocating input and being operable upon such input to move said window panel between said raised and lowered position, a control member selectively reciprocably shiftable along said track means, a blocking member having gripping means thereon and a clutch projection extending therefrom, said blocking member being shiftable along said track means and rotatable relative thereto about an axis of the former between a relaxed position and a blocking position wherein said gripping means bindingly engage said track means to prevent shifting movement of said blocking member, means on said control member defining a clutch aperture, said clutch projection being freely received within said clutch aperture so that said blocking member and control member are freely relatively shiftable under a positive window-controlling input to the latter between a mean condition and an engaged condition wherein the edges of said clutch aperture capture said clutch projection to maintain said blocking member in said relaxed position thereof and reciprocably shiftably as a unit with said control member, a draft link, means pivotally connecting a first end of said draft link to said blocking member on an axis spaced from the first-mentioned axis thereof, and means connecting a second end of said draft link to said window-operating mechanism, said draft link being shiftable under shifting movement of said blocking member as a unit with said control member to operate said window-operating mechanism and being momentarily shiftable upon reverse input to said window-operating mechanism under a force applied directly to said window panel to rotate said blocking member to said blocking position thereof so that shifting movement of said blocking member and further reverse shifting movement of said draft link is prevented.

3. In combination, in a vehicle body having a window panel mounted therein for movement between raised and lowered positions relative thereto, track means fixed to said vehicle body, a window panel operating mechanism responsive to a reciprocating input and being operable upon such input to move said window panel between said raised and lowered positions, a control member selectively reciprocably shiftable along said track means, a blocking member having gripping means thereon and a diamond-shaped clutch projection and a crank projection extending therefrom, said blocking member being shiftable along said track means and being rotatable relative thereto about an axis of the former between a relaxed position and blocking position wherein said gripping means bindingly engage said track means to prevent shifting movement of said blocking member, an intermediate plate fixedly secured to a control member and shiftable as a unit therewith and having a generally diamond-shaped clutch aperture therein, said clutch projection being freely received within said clutch aperture and said blocking member and control member being freely relatively shiftable under a positive window-controlling input to the latter between a mean condition and an engaged condition wherein adjacent edges of said diamond-shaped aperture capture corresponding adjacent sides of said diamond-shaped projection to maintain said blocking member in said relaxed position and reciprocably shiftable as a unit with said control member, a crankarm, means fixedly securing a first end of said crankarm to said crank projection for movement of the former as a unit with said blocking member, a draft link, means pivotally connecting a first end of said draft link to a second end of said crankarm on an axis spaced from the first-mentioned axis of said blocking member, means connecting a second end of said draft link to said window-operating mechanism, said draft link being shiftable under shifting movement of said blocking member as a unit with said control member to operate said window-operating mechanism and being momentarily shiftable upon reverse input to said window-operating mechanism under a force applied directly to said window panel to rotate said blocking member to said blocking position thereof so that shifting movement of said blocking member and further reverse shifting movement of said draft link is prevented.